US011450152B2

United States Patent
Ramachandra et al.

(10) Patent No.: US 11,450,152 B2
(45) Date of Patent: Sep. 20, 2022

(54) DETECTION OF MANIPULATED IMAGES

(71) Applicant: Norwegian University of Science and Technology, Trondheim (NO)

(72) Inventors: Raghavendra Ramachandra, Gjøvik (NO); Kiran Bylappa Raja, Gjøvik (NO); Sushma Venkatesh, Gjøvik (NO); Christoph Busch, Gjøvik (NO)

(73) Assignee: NORWEGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 144 days.

(21) Appl. No.: 16/625,951

(22) PCT Filed: Jun. 29, 2018

(86) PCT No.: PCT/EP2018/067692
§ 371 (c)(1),
(2) Date: Dec. 23, 2019

(87) PCT Pub. No.: WO2019/002602
PCT Pub. Date: Jan. 3, 2019

(65) Prior Publication Data
US 2020/0175290 A1    Jun. 4, 2020

(30) Foreign Application Priority Data

Jun. 30, 2017 (GB) ........................... 170560

(51) Int. Cl.
*G06V 40/40* (2022.01)
*G06N 20/00* (2019.01)
(Continued)

(52) U.S. Cl.
CPC ............. *G06V 40/40* (2022.01); *G06K 9/629* (2013.01); *G06K 9/6256* (2013.01);
(Continued)

(58) Field of Classification Search
CPC .......... G06K 9/00899; G06K 9/00228; G06K 9/00268; G06K 9/00288; G06K 9/4609;
(Continued)

(56) References Cited

U.S. PATENT DOCUMENTS

| 7,327,860 B2 | 2/2008 | Derakhshani et al. |
| 9,665,784 B2 | 5/2017 | Derakhshani et al. |
| 2018/0063169 A1* | 3/2018 | Zhao ..................... G06F 21/562 |

OTHER PUBLICATIONS

International Search Report and Written Opinion, PCT/EP2018/067692, dated Oct. 8, 2018 (16 pp.).
Raghavendra, R., et al., "Detecting Morphed Face Images", 2016 IEEE 8th International Conference on Biometrics Theory, Applications and Systems, Sep. 6, 2016 (7 pp.).
Bharati, A., et al., "Detecting FAcial Retouching Using Supervised Deep Learning", IEEE Transactions on Information Forensics and Security, vol. 11, No. 9, Sep. 1, 2016 (11 pp).
Raghavendra, R., et al., "Transferable Deep-CNN Features for Detecting Digital and Print-Scanned Morphed Face Images", 2017 IEEE Conference on Computer Vision and Pattern Recognition Workshops, Jul. 21, 2017 (9 pp).

(Continued)

*Primary Examiner* — Michael R Neff
(74) *Attorney, Agent, or Firm* — Eversheds Sutherland (US) LLP (57) ABSTRACT

An apparatus for detecting morphed or averaged images, wherein the morphed or averaged images are synthetically generated images including information from two or more different source images corresponding to two or more subjects. The apparatus may include a feature extraction module for receiving an input image and outputting a set of descriptor feature(s) characteristic of the image and a classifier module configured to allocate the input image either to a first class indicating that the image has been morphed or averaged or a second class indicating that it has not been morphed or averaged, based on the descriptor feature(s). The feature extraction module may include a plurality of neural networks providing complementary descriptor feature(s) to the classifier module. The apparatus further may include a fusion module for combining descriptor feature data from each neural network and transmitting the fused feature data to the classifier module.

24 Claims, 6 Drawing Sheets

(51) Int. Cl.
    *G06K 9/62*     (2022.01)
    *G06N 3/04*     (2006.01)
    *G06N 3/08*     (2006.01)
    *G06N 5/04*     (2006.01)
    *G06V 10/44*    (2022.01)
    *G06V 40/16*    (2022.01)

(52) U.S. Cl.
    CPC ............ *G06N 3/0454* (2013.01); *G06N 3/08* (2013.01); *G06N 5/04* (2013.01); *G06N 20/00* (2019.01); *G06V 10/443* (2022.01); *G06V 40/161* (2022.01); *G06V 40/168* (2022.01); *G06V 40/172* (2022.01); *G06K 9/6269* (2013.01); *G06K 9/6277* (2013.01)

(58) Field of Classification Search
    CPC .... G06K 9/6256; G06K 9/629; G06K 9/6269; G06K 9/6277; G06N 20/00; G06N 3/0454; G06N 3/08; G06N 5/04
    USPC ......................................................... 382/118
    See application file for complete search history.

(56) References Cited

OTHER PUBLICATIONS

Ergun Hilal et al., "Fusing Deep Convolutional Networks for Large Scale Visual Concept Classification", 2016 IEEE Second International Conference on Multimedia Big Data, Apr. 20, 2016 (4 pp.).
Office Action, EP 18 740 131.0, dated Feb. 15, 2022 (7 pp.).
Examination Report, India Application No. 201927054701, dated Feb. 7, 2022 (6 pp.).
Aloysius Neena et al: "A review on deep convolutional neural networks", 2017 International Conference on Communication and Signal Processing (ICCSP), IEEE, Apr. 6, 2017 (Apr. 6, 2017), pp. 588-592, XP0333314885 (5 pp.).
Guo Yanming et al.: "Deep learning for visual understanding: A review", Neurocomputing, vol. 187, Nov. 26, 2015 (Nov. 26, 2015), pp. 27-48, XP029484736 (22 pp.).

* cited by examiner

DETECTION OF MANIPULATED IMAGES

TECHNICAL FIELD

The invention relates to the detection of manipulated images, and in particular to images that have been manipulated in order to defeat identity-checking and related security measures. In particular, but not exclusively, the invention relates to the detection of facial images that have been morphed or averaged, for example when used in passports or other identity documents, applications for such documents, border control applications, or banking applications.

BACKGROUND OF THE INVENTION

Face recognition is a widely used biometric method that has become part of everyday life. The automatic recognition of individuals observing facial biometric characteristics, especially in constrained conditions, yields very high accuracy. This fact has elevated face biometrics to a prominent role in international border control. Facial recognition systems are built on knowledge gathered from signal and pattern recognition algorithms over the last 40 years, which has resulted in accurate and reliable face recognition algorithms. This performance increase has permitted the use of face biometrics in diverse applications that range from forensics, surveillance, physical and logical access control to e-Commerce and e-Government applications.

Biometric facial reference images have become an important part of electronic passports and visa applications, with nearly 800 million such passports having been issued over a ten-year introduction period. One of the reasons that face recognition was chosen for the border control scenario is that, in case of a false negative system decision, a visual comparison can be conducted by the border control officer. This is a distinct advantage over other biometric modalities (e.g. fingerprint recognition). These factors justify the applicability of face recognition in Automatic Border Control (ABC) e-gates. In a typical ABC system, the link between the electronic Machine Readable Travel Document (eMRTD) and the passport holder (i.e. the individual presenting the eMRTD to the border guard) is automatically verified by comparing the live captured face image with the facial reference image stored in the eMRTD passport. This facilitates a highly reliable and accurate border control process. Indeed, the International Civil Aviation Organization (ICAO) has decided to require a facial image as the primary identifier for eMRTDs. Thus, the facial image is the only biometric reference that is present in all electronic passports globally.

With the widespread adoption of ABC systems, the vulnerability of their face recognition subsystems to different kinds of attacks has gained more attention. These attacks can broadly be classified in two types: attacks on the ABC system and attacks on the eMRTD biometric reference.

The former type of attack is typically carried out on the capture device (or camera) at the passport gate by presenting a face artefact. Such attacks are referred to as face spoofing or presentation attacks. However, these attacks require a high degree of effort in generating a face artefact (i.e. artificial presentation attack instrument) and also in presenting the same to the ABC e-gate. Furthermore, this kind of attack can only be successful if the attacker can gain access to a lost or stolen eMRTD passport that will allow him to prepare the face artefact that can resemble the face photo present in the eMRTD passport.

The latter type of attack includes possible manipulation of the biometric data stored in the logical data structure (LDS) of the (stolen) passport, with the intent to replace the reference image. However, such attacks should easily be spotted because they would involve changing the hash that is computed over the facial image data group. Thus, a more effective approach is to exploit the deficiencies in the passport application and issuing protocol. It is this type of attack that is discussed further herein and to which embodiments of the invention relate.

This type of attack is simple to conduct, as most of the passport issuing procedures will accept a (printed) face photograph during the application process. Furthermore, several countries will accept a digital photograph uploaded to a web-portal for renewal of a passport as well as for a VISA application. In either case, this provides the opportunity for an attacker to submit a manipulated face photograph to the passport-issuing agency and in turn receive an authentic eMRTD passport with all physical and electronic security features and containing the manipulated photograph. Whilst the use of a biometric kiosk could address this issue, they are used in only a few passport application offices.

Software that is suitable for making the image manipulations necessary to execute such an attack is freely available. For instance, software that allows for the retouching of images, in particular the retouching of facial images, is often provided by online social mediums. Various different kinds of facial image alterations (e.g. geometric, aspect ratio and beautification) fall into the category of retouched images and may be utilised in such an attack. Indeed the risk of such an attack arising from retouched images has been recognised. IEEE Transactions on Information Forensics and Security, Vol 11, No. 9, September 2016, (IEEE, USA), Bharati, Singh, Vatsa & Bowyer, "Detecting Facial Retouching Using Supervised Deep Learning", pp 1903-1913 is a research paper that demonstrates the effect of digital alterations on the performance of automatic face recognition. This paper also introduces an algorithm to detect images that have been retouched.

Face morphing is another form of image manipulation that is emerging as the most critical attack on eMRTD passport and VISA issuance protocols, which always rely on images provided by the applicant. Whilst, as explained below, it causes a complex problem, the complexity of creating a morphed face image is fairly low due to the large number of freely available morphing software products available. For example, GIMP and GAP tools can generate a high quality morphed facial image with minimal effort.

The objective of face morphing (achieved via whole face morphing or averaging, or part based face morphing or averaging) is to generate a new synthetically generated facial image using the unique information available from two or more different source face images corresponding to two or more different subjects. Thus, face morphing differs from the retouching of facial images as the latter relies on the unique information available from only a single source face image corresponding to a single subject. The morphed facial image created will essentially constitute the facial appearance features corresponding to multiple data subjects that have contributed to the morphed face. Perhaps surprisingly, the resulting image will closely resemble both subjects visually for the human expert (e.g. border guard) and with regards to the similarity score for the automatic biometric face recognition system.

This provides an opportunity for any attacker (e.g. a known criminal) to morph his facial image with that of someone else (e.g. someone without a criminal record) and apply for an eMRTD passport that can be used by both persons. Since eMRTD passports can now widely be used with ABC systems for border control, an attacker could execute this attack without ever forging a passport document. Thus, this kind of attack needs to be mitigated to assure the security of border control processes.

The vulnerability of the enrollment process for face morphing attacks has been demonstrated on commercial face recognition algorithms. Also, the difficulty in humans detecting a morphed image has been demonstrated experimentally —even face recognition experts fail to detect morphed face images.

A further complication is that, in line with the passport application process used in most countries where a printed image is submitted, morphed face images can be printed and subsequently scanned again (at the passport office) with typically 300 dpi resolution following the ISO/IEC standards for generating the ID documents. The re-digitized version of the morphed images loses pixel-level information that might otherwise assist in detecting morphed images. Also, the digitally morphed images can be retouched to enhance the visual quality and remove any ghosting appearance before printing and submission such that the morphed image resembles high quality image submitted by any subject for passport/VISA issuance. It has been demonstrated that ABC systems are particularly vulnerable to eMRTD passports incorporating such images.

To date, aside from the inventors' work there is no approach reported to detect on the basis of a single image a morphed face image automatically and reliably.

SUMMARY OF THE INVENTION

According to a first aspect of the invention there is provided an apparatus for detecting morphed or averaged images, wherein the morphed or averaged images are synthetically generated images comprising information from two or more different source images corresponding to two or more subjects, the apparatus comprising: a feature extraction module for receiving an input image and outputting a set of descriptor feature(s) characteristic of that image; and a classifier module configured to allocate the input image either to a first class indicating that the image has been morphed or averaged or a second class indicating that it has not been morphed or averaged, based on the descriptor feature(s); wherein the classifier module comprises a machine-learning system trained to classify a single image using a training data set comprising morphed or averaged images and images that have not been morphed or averaged.

Thus, the invention provides an apparatus that detects morphed or averaged images (part based or whole image based), such as morphed or averaged photographs, by means of machine-learning using set of training data to train the classifier. In particular, it is able to do so using a single input image, which the trained apparatus analyses to determine whether it has been morphed or averaged. The training data set may comprise a set of morphed or averaged images and images that have not been morphed or averaged.

Whilst the apparatus is able to make the determination by analysing only the single input image itself, it may of course be used to analyse multiple such images in this way, either sequentially or simultaneously.

Preferably, the extraction module also comprises a machine-learning system such that the descriptor features depend on parameters determined from the use of a training data set comprising images.

Although the invention may be used in the detection of morphed or averaged images generally, in view of the known issues discussed above concerning morphing of passport and ID document photographs, the apparatus is preferably configured to detect morphed or averaged facial images and so the classifier module determines whether the single input image has been morphed or averaged.

Whilst a single raw image could be input into the apparatus, it is highly preferred for the input images to be standardised as far as possible. Thus, the apparatus preferably further comprises an image pre-processing module arranged to extract and normalise a region of interest (for example a human face) from the image and transmit the pre-processed image to the feature extraction module.

To extract a human face, any suitable face detector algorithm may be used, for example, the Viola-Jones algorithm. Pre-processing may also include orienting the image, e.g. by means of affine translation and/or cropping the image to a suitable size for inputting into the system.

Although in principle any suitable feature extraction system may be employed, the feature extraction module may usefully comprise a set of filters that are convolved with patches of the input image to provide a set of descriptor feature(s). The patches may be non-overlapping (i.e. may tile the image) or may overlap by any suitable "stride" (i.e. the number of pixels between their centres). The image patches and filters may be regarded as matrices, typically of the same size, and the convolution may involve multiplying the corresponding elements of the matrices and may involve summing the results to provide a single scalar per filter.

Preferably, a plurality of such filters are convolved with each patch to provide a set of output values.

The set of descriptor features may comprise a string of binarised quantities derived from the convolutions, for example Binarised Statistical Image Features (BSIF). As described herein, this involves allocating binary values of 1 or 0 to each of the scalar values discussed above.

The invention may use filter sizes, such as 3×3, 5×5, 7×7, 9×9, 11×11, 13×13, 15×15 and 17×17 and with 8 different bit lengths, such as 5, 6, 7, 8, 9, 10, 11 and 12. For instance, a filter of size of 11×11 with a 12-bit length may provide best performance in terms of accuracy as compared to other filters.

The classifier module may be of any suitable type. It may comprise a linear support vector machine or a probabilistic collaborative representation classifier, for example.

In a preferred form of the invention, the feature extraction module comprises at least one convolutional neural network. Such networks comprise one or more convolution layers (stages) which each have a set of learnable filters (also referred to as 'kernels'). Preferably, the neural networks are deep convolutional neural networks (D-CNN). The term "deep" signifies that a plurality of such filters are provided. Preferably, three or more convolutional layers are provided, but most preferably there are 5 or more, and even more preferably, 7 or more.

The first convolution layer of a D-CNN receives as its input a set of patches of the image. The patches may be overlapped, with the number of pixels between the centres of each patch being called the "stride". For a black and white image, each patch has dimensions m×n, where the input image is in colour, each patch has dimensions m×n×3 (for RGB), m and n being the row and column size of chosen patch.

The filters generally correspond in dimensions to the patches and each convolution is calculated by multiplying the corresponding members of each matrix and summing the result. In other words, each filter may be convolved across the width and height of the input volume (patch) to provide an activation map. The stack of maps for all filters may provide the depth dimension. Thus, the dimensions of the matrix output by the layer may correspond to the number of patches and the number of filters applied.

The convolution layers are typically arranged in series so that the matrix provided as the output from a given patch forms the input to the next stage. Since these convolution layers preferably deal with each patch independently (i.e. in parallel), they are merely "locally connected", as opposed to "fully connected".

D-CNNs may also have "pooling" layers where meaningful features are extracted with the effect that the data is "simplified", e.g. by "max pooling" where a set of j×k values are replaced by a single value corresponding to the maximum one in the set.

Whilst the apparatus may comprise a single neural network, it is preferred that the feature extraction module comprises a plurality of (at least substantially) statistically independent neural networks providing complementary descriptor feature(s) to the classifier module.

As will be described below, this provides a synergistic effect in that it results in the classifier being able to take account of independent descriptor features, which effectively provide a "cross-check", thereby greatly enhancing the reliability of the system. This is based upon the recognition by the inventors that, even where neural networks are trained on the same data, where they have substantially different architectures, this will result in distinctive and complementary descriptor features being provided by them.

This concept is regarded as being particularly and independently inventive. Therefore, viewed from another aspect, there is provided an apparatus for detecting morphed or averaged images, wherein the morphed or averaged images are synthetically generated images comprising information from two or more different source images corresponding to two or more subjects, the apparatus comprising: a feature extraction module for receiving an input image and outputting a set of descriptor feature(s) characteristic of that image; and a classifier module configured to allocate the input image either to a first class indicating that the image has been morphed or averaged or a second class indicating that it has not been morphed or averaged, based on the descriptor feature(s); wherein the feature extraction module comprises a plurality of (preferably substantially statistically-independent) neural networks providing complementary descriptor feature(s) to the classifier module; the apparatus further comprises a fusion module for combining descriptor feature data from each neural network and transmitting the fused feature data to the classifier module; and the classifier module comprises a machine-learning system trained to classify single images using a training data set comprising morphed or averaged images and images that have not been morphed or averaged.

The term "substantially statistically independent" means that they provide complementary descriptor features, thereby significantly improving the accuracy of detection compared to the use of a single neural network.

As discussed above, the neural networks are preferably D-CNNs. Whilst in principle, the descriptor features may be obtained from any layer of the D-CNN, it is preferred for them to be extracted from the first fully-connected layer of each deep convolutional neural network. The invention of this aspect may comprise any of the preferred or optional features described in relation to other aspects. In particular, it may be adapted for the detection of morphed facial images.

Since the apparatus uses the outputs from two neural networks, preferably the apparatus further comprises a feature level fusion module for combining descriptor feature data from each deep convolutional neural network and transmitting the fused (e.g. concatenated) feature data to the classifier module.

Neural networks intended for image recognition/object detection and recognition are available pre-trained for such purpose based on normal images. It is possible to use such networks in the invention without further training since the classifier is separately trained to detect morphed or averaged images. However, it is preferred for the neural network(s) to be individually trained using a set of images comprising morphed or averaged and images that have not been morphed or averaged (e.g. morphed and normal) in order to train their filters to provide descriptor features suited for determining whether an image has been morphed or averaged.

Although any suitable D-CNNs may be used in the invention, particularly once trained (or fine-tuned) on suitable image datasets, the invention preferably uses two popular pre-trained D-CNNs namely VGG19 and AlexNet. The inventors have determined that these D-CNNs are substantially statistically independent.

VGG19 employs very small (i.e. 3×3) convolution filters, with a large number (16-19) of layers. AlexNet, on the other hand, uses rather larger filters (e.g. 11×11 with a stride of 4 in the first layer) and eight layers, of which five are convolutional. It also includes some "dropout" layers where certain outputs are set to zero.

The invention also extends to corresponding methods and so, viewed from another aspect, the invention provides a method of detecting morphed or averaged images, wherein the morphed or averaged images are synthetically generated images comprising information from two or more different source images corresponding to two or more subjects, the method comprising: receiving an input image; generating a set of descriptor feature(s) characteristic of that image; and classifying the image by allocating it to either to a first class indicating that the image has been morphed or averaged or a second class indicating that it has not been morphed or averaged, based on the descriptor feature(s); wherein the classification step comprises using a machine-learning system trained to classify single images using a training data set comprising morphed or averaged images and images that have not been morphed or averaged.

As previously discussed, the step of generating the descriptor feature(s) preferably comprises using a plurality of substantially statistically independent neural networks, preferably D-CNNs, providing complementary descriptor feature(s) to the classifier module; and descriptor feature data from each neural network is combined prior to classification.

Likewise, the method may further comprise the step of training a classifier used in the classifying step, prior to use. It may also comprise training a feature extraction module that generates the descriptor feature(s) using a set of images comprising morphed or averaged images and images that have not been morphed or averaged in order to train the module to provide descriptor features suited for determining whether an image has been morphed or averaged.

Indeed, the method may further involve steps corresponding to any or all of the preferred or optional features discussed above in relation to the apparatus of the invention.

As discussed above, a particular application of the present invention is in the detection of morphed or averaged images that may be presented to a passport/VISA issuing office, or indeed presented at an automated passport gate, for criminal or fraudulent purposes. The invention therefore extends to a method of preventing such activity by detecting a morphed image in relation to a passport or other identity document and to automated apparatus for such purpose, including an automated passport gate including such apparatus.

The invention will generally be implemented using a computer or other suitable data-processing apparatus, typically involving a memory, processor and data storage. Accordingly, the invention also extends to a software product for programming or otherwise configuring such apparatus to provide the apparatus and/or method of the invention. Thus, another aspect of the invention provides such a software product.

Whilst the above aspects of the invention have a particular focus on the detection of morphed or averaged images, it will be recognised that the apparatus and methods discussed above may equally be used to detect images that have been manipulated in some other way (e.g. retouched). The invention can therefore be used in the detection of manipulated images more generally.

Thus, according to another aspect of the invention there is provided an apparatus for detecting manipulated images comprising: a feature extraction module for receiving an input image and outputting a set of descriptor feature(s) characteristic of that image; and a classifier module configured to allocate the input image either to a first class indicating that the image has been manipulated or a second class indicating that it has not been manipulated, based on the descriptor feature(s); wherein the classifier module comprises a machine-learning system trained to classify a single image using a training data set comprising manipulated images and non-manipulated images. There is also provided a corresponding method in yet a further aspect of the invention. It will be recognised that these aspects of the invention equally benefit from the optional features and/or steps discussed above in relation to the previously discussed aspects of the invention.

BRIEF DESCRIPTION OF THE DRAWINGS

Certain preferred embodiments of the present invention will now be described, by way of example only, and with reference to the accompanying drawings, in which.

DETAILED DESCRIPTION

Figure 1:
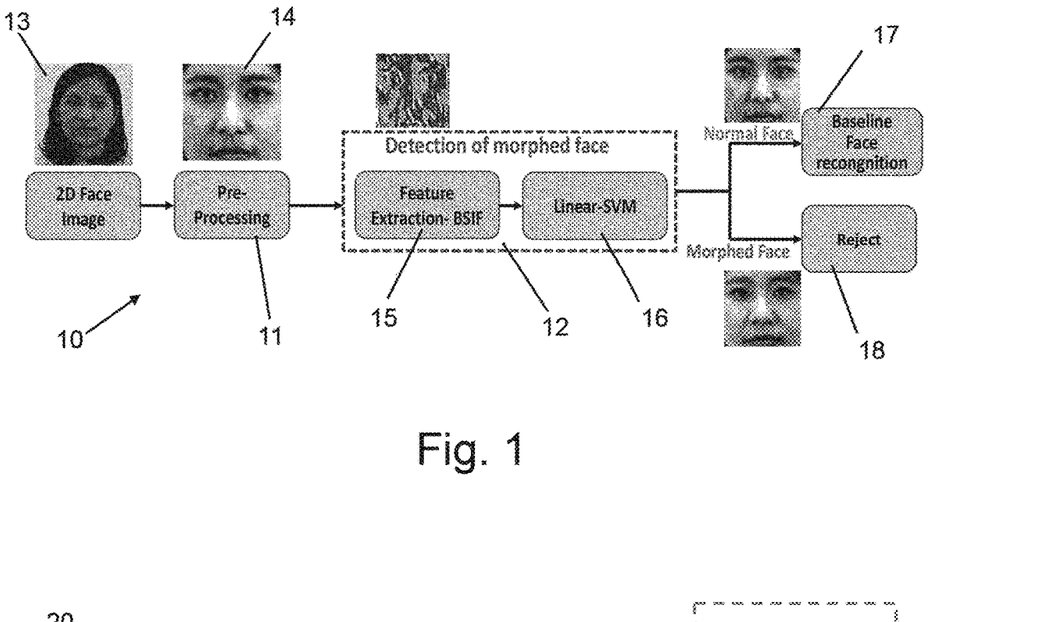
FIG. 1 is a block diagram showing a morphed facial image detection system according to a first embodiment of the invention.

Referring first to FIG. 1, there is shown a block diagram of the first embodiment 10 of a system for robust morphed face image detection. It has two main stages: pre-processing 11 and morphed face detection 12.

The first step is for the image 13, which is to be subject to detection, to be input into the system.

Next, the pre-processing stage 11 extracts a normalized face region. This involves, firstly, detecting the face within the image. This is carried out using the Viola-Jones algorithm, a well-known object detection framework, which is robust and performs well in real-world scenarios. (Any other face detector e.g. a D-CNN-based face detector may be used.) In the next step, the image 13 is normalized to compensate for rotation using an affine transformation, and finally, the normalized image is resized to x by y pixels (here, 120×120 pixels). This results in the output of a standard-sized normalised image 14.

By way of overview, the morphed face detection stage 12 is based on analysis of micro-texture features extracted from a normalized face image 14. This is done using Binarised Statistical Image Features (BSIF) filters 15 with the output (a set of detected features) being passed to linear support vector machine (SVM) 16 for classification. This classifies the image as either "Normal Face" 17 or "Morphed Face" 18 (i.e. rejected).

BSIF filtering is a known technique for providing image descriptors (see J. Kannala and E. Rahtu. "BSIF: Binarized statistical image features" 21st *International Conference on Pattern Recognition* (ICPR), 2012 pages 1363-1366). A grey scale image is first normalised such that 0 represents the average intensity (i.e. so the matrix representing the normalised image includes negative and positive values) and then divided up into square patches of I×I pixels (i.e. each patch is represented by an I×I matrix of real numbers).

Each patch then undergoes convolution with a series of n linear filters, each of which is also an I×I matrix of real numbers to provide the filter responses. The filter response for each filter is calculated by multiplying the corresponding members of each matrix and summing the results. The sum is then binarised by providing the output of 1 if it is greater than 0 and an output of 0 otherwise. Since a set of n filters is applied, a string of n binary bits is provided, the value of which forms the BSIF descriptor of the image (a feature) and can be used to classify it.

Returning to FIG. 1, the features are obtained from the image at stage 15. The particular set of filters used is an open source set. This was originally determined by a machine-learning training stage using 50,000 image patches randomly sampled from 13 different natural scenic images (see A. Hyvearinen, J. Hurri, and P. O. Hoyer. *Natural Image Statistics*, volume 39. Springer, 2009). The machine learning was unsupervised and used the Independent Component Analysis method (see J. H. van Hateren and A. van der Schaaf. Independent component filters of natural images compared with simple cells in primary visual cortex. *Proceedings of the Royal Society of London. Series B: Biological Sciences,* 265(1394):359-366, 1998). The resulting filters are highly statistically independent. Thus, the set of filters are optimised for image recognition, but in this embodiment they are not specifically trained in relation to morphed image detection.

Since the BSIF filters are generated based on unsupervised learning, any number of filters with different sizes may be used. The inventors evaluated eight different filter sizes, such as 3×3, 5×5, 7×7, 9×9, 11×11, 13×13, 15×15 and 17×17 and with 8 different bit lengths such as 5, 6, 7, 8, 9, 10, 11 and 12. The filter of size of 11×11 with a 12-bit length was selected as most preferable in terms of accuracy, based on the experiments on a development dataset (see below).

Figure 2:
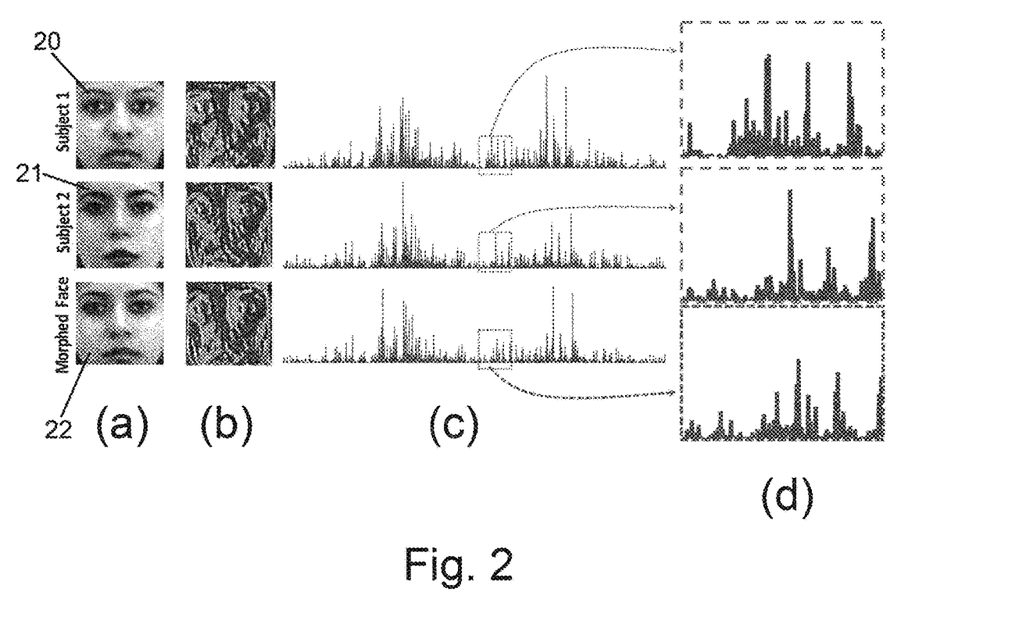
FIG. 2 is a diagram illustrating the qualitative results of the BSIF stage of the embodiment of FIG. 1 in which (a) is a group of normalised facial images; (b) is a corresponding group of images showing BSIF features; (c) is a histogram of those BSIF features; and (d) is an enlarged portion of the same histogram.

FIG. 2 shows the qualitative output of BSIF features obtained on both normal and morphed face images using the preferred filter size. The normalised image of first and second subjects 20, 21 are shown at 2(a) along with a normalised morphed image 22 of the same two subjects.

The result of applying the filters is shown at FIG. 2(b), where the BSIF features (i.e. the descriptors for each patch) are shown converted to grey scale at the location of the patch to which they relate. In addition, the histograms shown at FIG. 2(c) illustrate the values of the descriptors for each patch in a linear sequence of bins. Since 12 filters are used, each descriptor has a bit length of 12 and hence a dimension of 1×4096 (i.e. $2^{12}$).

It is notable that the BSIF histogram features (FIG. 2(c)) indicate the variations in the histogram profile between normal and morphed face image. The difference can be seen further by zooming into the histogram profile in corresponding bins for all three face images, as illustrated in FIG. 2(d).

Returning to FIG. 1, the descriptor data (i.e. that shown in FIG. 2(c)) is then passed to the linear SVM classifier 16. This has previously been trained in the well-known manner, using a large set of positive (normal faces) and negative (morphed) samples (see the Experiment below for an example), such that it is able to distinguish between them with a high degree of reliability. Thus, the SVM classifier uses the descriptor data to determine whether the presented face image belongs to the normal (reference 17) or the morphed (reference 18) class and provides a corresponding output to the user. Where the system is employed, for example, at a passport/VISA issuance office, allocation of an image to the morphed class would result in the image being rejected.

In a variant of the first embodiment, the BSIF feature extraction system is replaced by a single deep convolutional neural network (D-CNN) as used in the second embodiment described below—either described D-CNN may be used. It may also use the classifier system of the second embodiment, which may receive its input from the first fully connected layer of the D-CNN, as is also described in relation to the second embodiment (the feature level fusion of the second embodiment not being required).

Experiment

Figure 3:
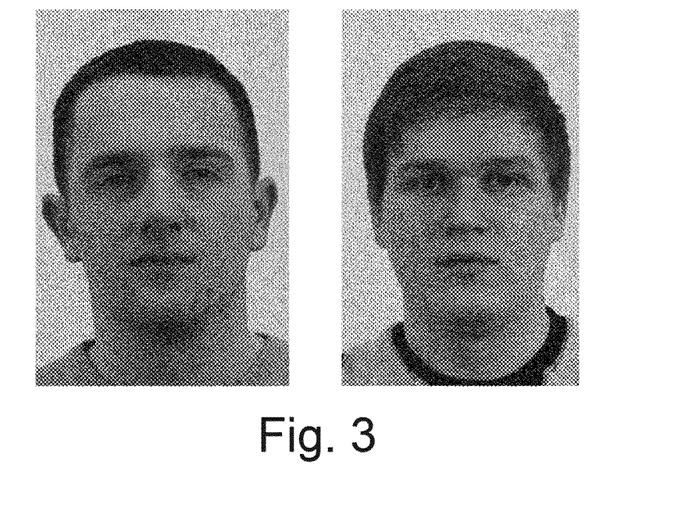
FIG. 3 is a pair of photographs of subjects for use in creating a morphed image.

The inventors constructed a new large-scale morphed face database comprised of 450 morphed images generated using different combination of facial images stemming from 110 data subjects. The first step in the data collection was to capture the face images following the ICAO capture standards as defined in the eMRTD passport specification. To this extent, they first collected the frontal face images in a studio set up with uniform illumination, uniform background, neutral pose and normal facial expression. The images were captured using a Canon EOS 550D DSLR camera mounted on a tripod and placed at a distance of 2 meters from the subjects. FIG. 3 shows examples of captured high-quality face images of two data subjects.

Figure 4:
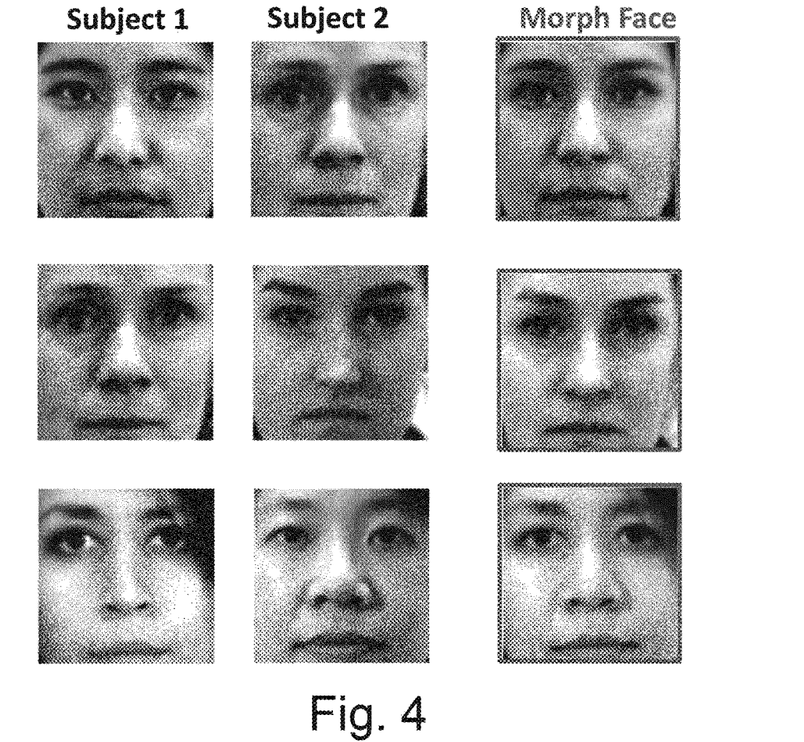
FIG. 4 is a set of normalised images of pairs of subjects and corresponding morphed images for use in creating a morphed image database.

The morphed face images were then generated using the freely available GNU Image Manipulation Program v2.8 (GIMP) and GIMP Animation Package (GAP) tools. The two face images that were to be morphed were manually aligned and provided as an input to the GAP tool. The GAP tool then generated a sequence of image frames showing the translation of one subject to another. The final morphed image was selected manually by confirming its resemblance to the faces of the contributing subjects to the morphing process. FIG. 4 shows three examples of morphed face images that were obtained using two different subjects for each, though morphed images were also generated using three subjects in a similar manner. The left column shows images of the first subjects, the second column shows images of the second subjects and the third column shows the respective morphed images.

In order to adequately evaluate the morphed face database and to benchmark the morphed face detection algorithms, the whole database of 450 morphed images was divided into three independent sub-sets: training set, development set and testing set. The training set comprised 200 morphed images, which were used exclusively for training the SVM classifier. The development set comprised 50 morphed images, which were used to tune the parameters of the proposed scheme especially in selecting the size and length of the BSIF filter. The testing set comprised 200 morphed images, which were solely used to report the results of the morph face detection algorithms.

A vulnerability analysis was performed on the morphed face image database using the commercially available Verilook face recognition SDK available from Neurotechnology (see http://www.neurotechnology.com/verilook.html). The analysis was carried out by enrolling a morphed face image to Verilook and using a probe sample corresponding to one of the data subjects used to create the morphed image. Thus, for each enrolled morphed face, either two or three different comparison scores were obtained, depending on the number of subjects used to create the morphed face image.

Figure 5:
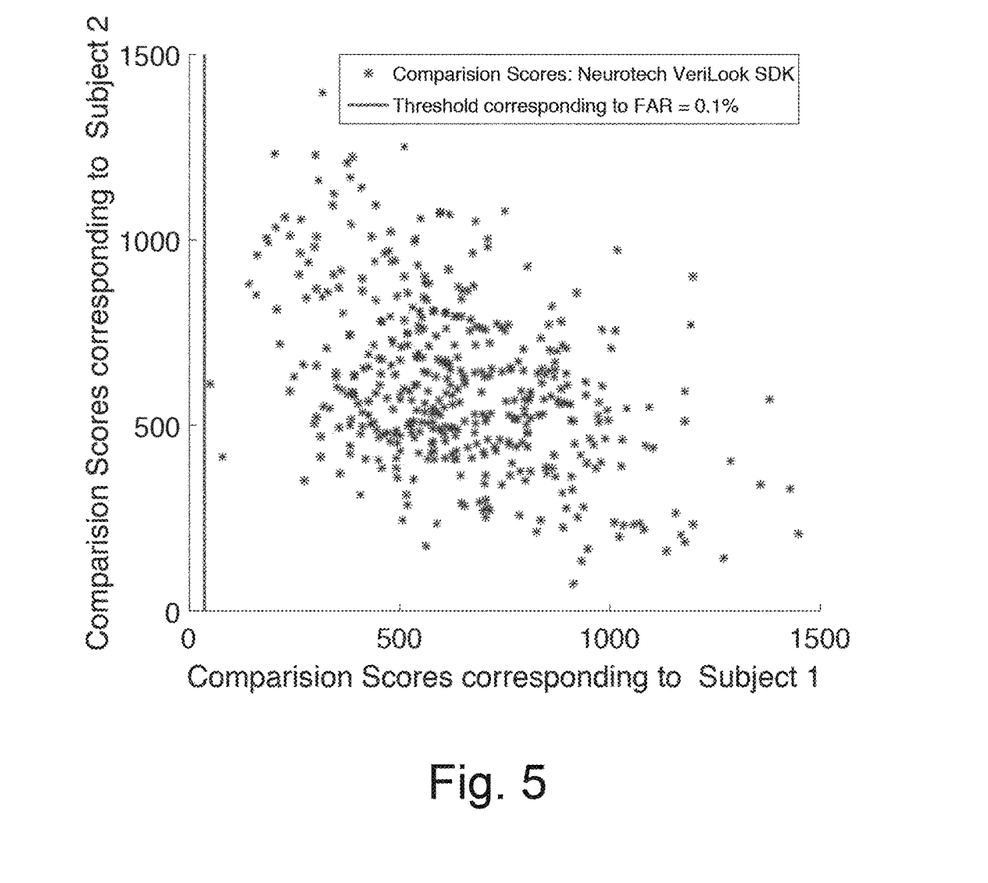
FIG. 5 is a graph showing scattered comparison scores obtained comparing morphed images from the database to the subjects from which the morphed image was created.

FIG. 5 shows the scattered comparison scores obtained on the whole database comprised of 450 morphed images using the Verilook face SDK. The effectiveness of these scores is assessed following the guidelines of FRONTEX (the European Agency for the Management of Operation Cooperation at the External Borders of the Member States of the European Union). FRONTEX recommends that the face verification algorithm in an ABC system operating in the verification mode should provide a performance whereby the False Acceptance Rate (FAR) is 0.001 (0.1%) or better. At this configuration the FRR should not be higher than 0.05 (5%). In the experiments the threshold score provided by the SDK was used, which is 36 for the given FAR=0.1%. The vertical red line in FIG. 5 indicates this verification threshold value corresponding to the target FAR=0.1%. Thus, the comparison scores greater than 36 are considered as successful verifications. As may be noted from FIG. 5, all morphed images were successfully matched for this threshold, thereby indicating the attack potential of the morphed face images for real-world applications.

Quantitative results using the first embodiment for automated morphed face detection are discussed below, along with a comparative evaluation of four different contemporary feature extraction schemes: Image Quality Analysis (IQA), Local Binary Patterns (LBP), Local Phase Quantisation (LPQ) and 2D Fast Fourier Transform (2DFFT). These comparators were selected in view of their relevance to the problem and also their accuracy in recent Presentation Attack Detection work. The classification of these feature extraction schemes was carried out with linear SVM to be consistent with the proposed scheme.

Two different performance evaluation metrics were defined to quantify the results: (i) Normal Face image Classified as Morphed face image (NFCM)—i.e. the ratio of normal face images classified as morphed face image; and (ii) Morphed Face image Classified as a Normal face image (MFCN)—i.e. the ratio of morphed face images classified as normal face. The overall accuracy can be measured using an Average Classification Error Rate (ACER) defined as: ACER=(NFCM+MFCN)/2.

Table 1 indicates the quantitative results of the first embodiment ("Proposed Method" in the table) along with the four different baseline algorithms employed in this work.

TABLE 1

| Algorithms | MFCN (%) | NFCM (%) | ACER (%) |
|---|---|---|---|
| Image quality [7] - SVM | 1.73 | 73.37 | 37.55 |
| LBP [16] - SVM | 37.66 | 13.20 | 25.43 |
| LPQ [2] - SVM | 29.00 | 11.47 | 20.23 |
| 2DFFT [15] - SVM | 61.03 | 37.22 | 49.12 |
| Proposed Method | 3.46 | 0 | 1.73 |

Based on the obtained results the following can be observed:
  The best performance is noted for the use of the first embodiment ("Proposed Method") with an ACER of 1.73%.
  The best MFCN is noted for the image quality analysis features with MFCN of 1.73%, but the NFCM value for this setting is quite high at 73.37%, which is not applicable in a real-world scenario.

Thus, the use of statistical image features based on the BSIF filters demonstrated the best performance compared with the conventional feature extraction techniques. The obtained results demonstrate the applicability of the first embodiment for automated morphed face detection.

The second embodiment of the invention will now be discussed with reference to the remaining figures. It is particularly suited to the recognition of morphed images which have undergone a print-scan process and which are therefore more difficult to detect than "digital" morphed images. The print-scan process corresponds to the passport application process that is most widely employed.

Figure 6:
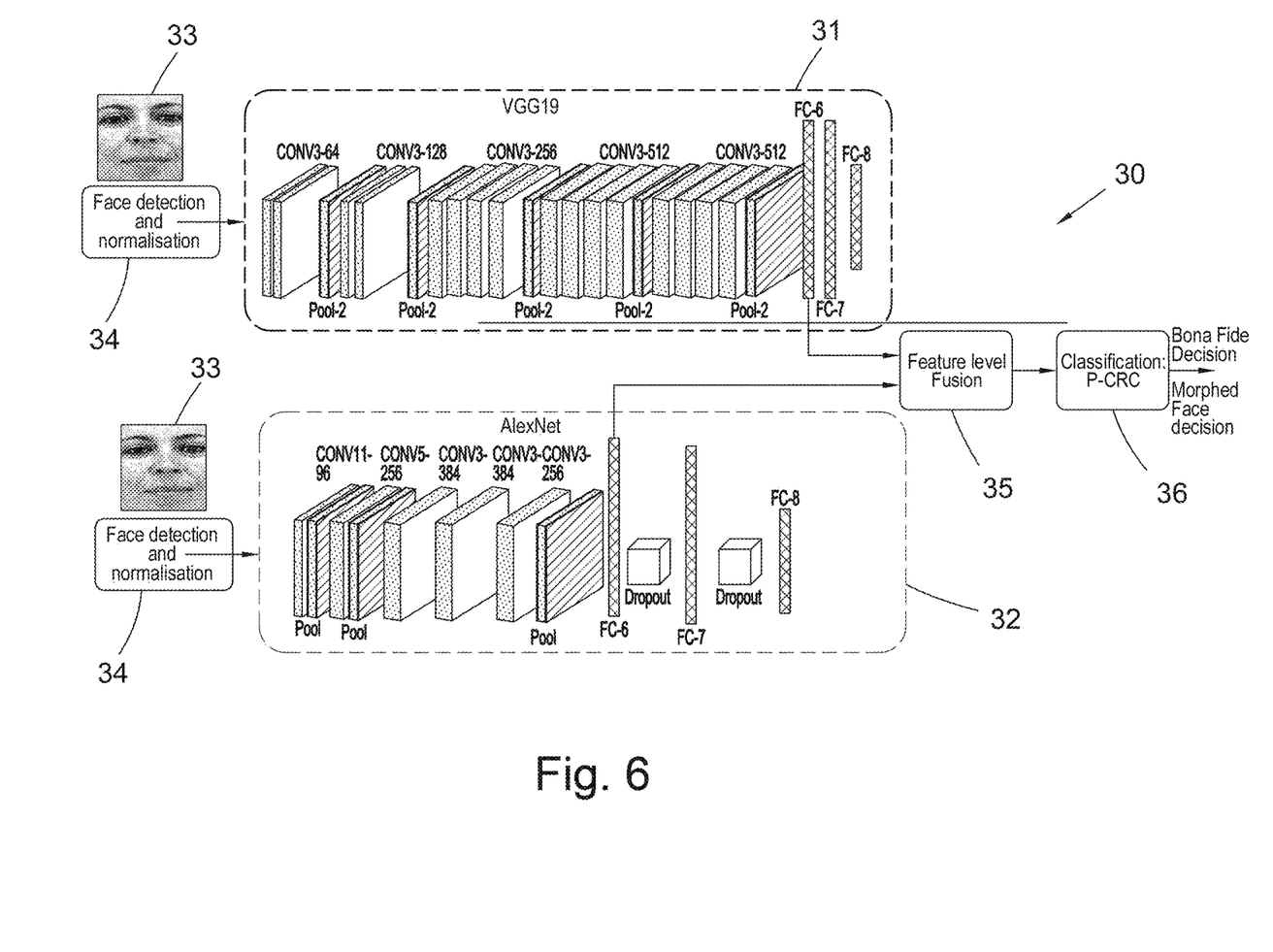
FIG. 6 is a block diagram showing a morphed facial image detection system according to a second embodiment of the invention.

FIG. 6 shows a block diagram of system 30 of the second embodiment. As will be discussed in more detail below, it is based upon feature-level fusion of two pre-trained deep convolutional neural networks (D-CNN) 31, 32 to detect morphed face images. The neural networks employed are known for use in image recognition and are pre-trained for that purpose.

Convolutional neural networks comprise one or more convolution layers (stages), which each have a set of learnable filters (also referred to as 'kernels') similar to those used in the previous embodiment. The term "deep" signifies that a plurality of such filters are provided.

Like the BSIF feature extraction system used in the first embodiment, the first convolution layer of a D-CNN receives as its input a set of patches of the image. The patches may be overlapped, with the number of pixels between the centres of each patch being called the "stride".

For a black and white image, each patch has dimensions m×n, where the input image is in colour, each patch has dimensions m×n×3 (for RGB) and m, n being the row and columns of the image patch. The filters each correspond in dimensions to the patches and the filter response for each filter (i.e. convolution) is calculated by multiplying the corresponding members of each matrix and summing the result. In other words, each filter is convolved across the width and height of the input volume (patch) to provide an activation map. The stack of maps for all filters provides the depth dimension. Thus, the dimensions of the matrix output by the layer correspond to the number of patches and the number of filters applied.

The convolution layers are arranged in series so that the matrix provided as the output from a given patch forms the input to the next stage. Since these convolution layers deal with each patch independently (i.e. in parallel), they are merely "locally connected", as opposed to "fully connected".

Deep-CNNs also have "pooling" layers where meaningful features are extracted with the effect that the data is "simplified", e.g. by "max pooling" where a set of j×k values are replaced by a single value corresponding to the maximum one in the set.

Following a plurality of convolutional layers (and usually pooling layers), there will be one or more fully-connected layers which receive data based upon the characteristics of the entire image and includes a classification stage which provides an output allocating the input image to one of a number of classes.

The two known Deep-CNNs (which were designed for image recognition) used in this embodiment each have a large number of convolution and pooling layers followed by some fully-connected layers. They are pre-trained for use in image recognition in a broadly similar manner to that discussed in relation to the BSIF system—i.e. a training dataset is used in a machine-learning process whereby the optimal filters for image recognition are learned.

Returning to FIG. 6, the system of the second embodiment is structured using three main functional blocks that include: (i) preprocessing an image 33 at blocks 34, (ii) feature level fusion of two D-CNNs 31, 32 at block 35 and (iii) classification at block 36. The functionality of each block is discussed below.

The pre-processing blocks 34 are each broadly similar to the corresponding blocks 11 described in relation to the first embodiment. Thus, starting with the facial image 33, face detection is carried out using the Viola-Jones algorithm, the detected face region is normalized to compensate rotation using an affine transform and the image is resized to 227× 227 pixels. (This size is used because it is adaptable to the size of the input layer of the D-CNNs that are also pre-trained with images of this size.)

The same pre-processed output is then provided to each of two different D-CNNs.

The system uses two popular pre-trained D-CNNs namely VGG19 (reference 31) and AlexNet (reference 32)—see respectively (i) K. Simonyan and A. Zisserman. "Very deep convolutional networks for large-scale image recognition". *arXiv preprint arXiv:*1409.1556, 2014 and A. Krizhevsky, I. Sutskever; and (ii) G. E. Hinton. "Imagenet classification with deep convolutional neural networks". In *Advances in neural information processing systems*, pages 1097-1105, 2012.

VGG19 employs very small (i.e. 3×3) convolution filters, with a large number (16-19) of layers. AlexNet, on the other hand, uses rather larger filters (e.g. 11×11 with a stride of 4 in the first layer) and eight layers, of which five are convolutional. (It also includes some "dropout" layers where certain outputs are set to zero.) The convolution and pooling layers of each D-CNN are shown schematically in the figure.

Both D-CNNs are trained on the same large-scale ImageNet database. However, as they are based on different configurations (i.e. architecture), despite being trained on the same database, they provide complementary features suitable for detecting morphed face images.

The D-CNNs are fine-tuned before use using a morphed face database (see below).

The combination of the two networks occurs at the feature level, where the features extracted from each network using a set of convolutional layers are fused, e.g. by concatenation. As may be seen from FIG. 6, outputs are extracted from the first fully connected layer (FC-6) of both networks 31, 32. This layer is chosen to utilise the full-scale features before the drop-out layers employed especially in AlexNet. Then, at Feature Level Fusion block 35, these features are concatenated to form a single vector which is then input into the classification block 36.

Similarly to the classifier of the first embodiment, the classification block 36, which has previously been trained in the known manner, uses the feature vector to determine whether the image is normal or morphed (and hence should be rejected). The classifier employed is a Probabilistic Collaborative Representation Classifier (P-CRC), which maximizes the likelihood ratio of a test sample jointly with other classes to perform the classification.

As with the first embodiment, the classifier 36 of the second embodiment is trained using a training dataset from a morphed facial image database containing both normal and morphed images. Details of the database are set out in Table 2:

TABLE 2

| Type | Number of samples | | |
|---|---|---|---|
| | Training set | Testing set | Total |
| Bona fide image | 206 | 146 | 352 |
| Morphed image | 225 | 206 | 431 |

However, in addition, this training dataset is used to independently fine-tune the VGG19 and AlexNet networks, which are pre-trained in image recognition, but not in relation to morphed images. The fine-tuning involves training each individual D-CNN to classify images as normal or morphed before they are used in combination as described above.

While fine-tuning the networks, a high value of the learning rate is applied on the last layer when compared to the rest of the layers in the network. The learning parameters used were a weight learning rate factor of 10 and a bias learning rate factor of 20.

Analysis

Figure 7:
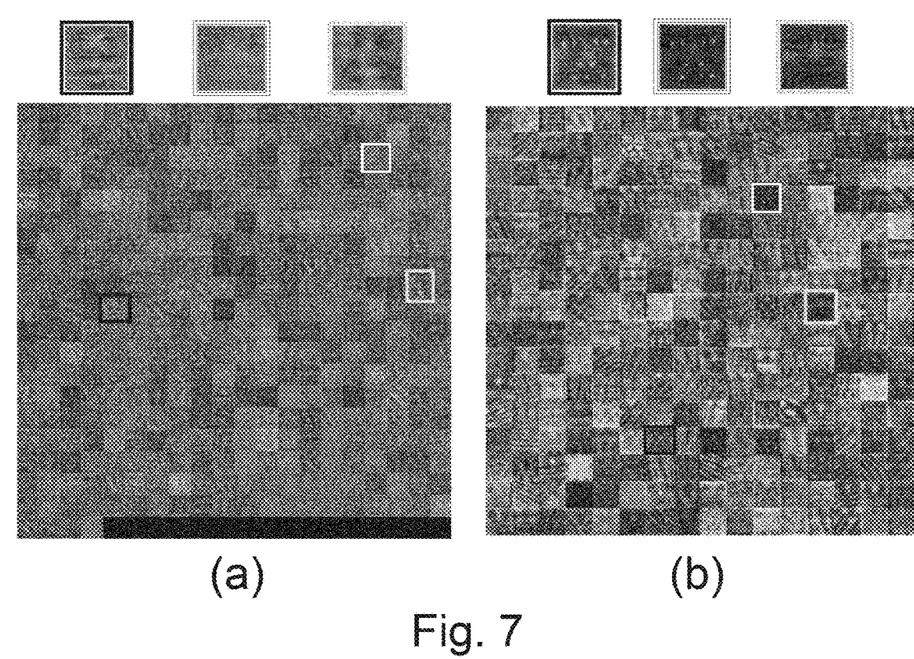
FIG. 7 illustrates the weights of the filters used in convolution layers of deep convolutional neural networks used in the second embodiment having a 3×3 filter size from (a) the known AlexNet and (b) the known VGG19 networks respectively.

In order to visualize the network features of the fine-tuned VGG19 and AlexNet, the features from the third Convolution layer (Conv3) from both D-CNNs are shown in FIG. 7.

FIG. 7(a) shows the Conv3 features from the fine-tuned AlexNet with a convolution filter size of 3×3 and length 384. It is interesting to observe that each convolution filter exhibits facial features and textural features. Further, the highlighted regions (in different colour) indicate the face specific features that are learned by the fine-tuned AlexNet.

A similar observation can also be noted from FIG. 7(b), which is the corresponding illustration for the fine-tuned VGG19 with a Conv3 layer having a convolutional filter size of 3×3 and a length of 256. The highlighted regions in FIG. 7(b) show the elements from the facial characteristic learned by the fine-tuning of VGG19.

The degree to which the features from the two fine-tuned D-CNN networks provide complementary information (and hence a synergistic effect) was investigated by calculating the relevant cross-correlation coefficients (CC) as follows:

$$CC = \frac{\sum_m \sum_n (F_{Alex} - \overline{F}_{Alex})(F_{VGG} - \overline{F}_{VGG})}{\sqrt{\left(\sum_m \sum_n (F_{Alex} - \overline{F}_{Alex})^2\right)\left(\sum_m \sum_n (F_{VGG} - \overline{F}_{VGG})^2\right)}} \quad (1)$$

where $F_{VGG}$ and $F_{Alex}$ represent values of the descriptor features from each D-CNN and $\overline{F}_{VGG}$ and $\overline{F}_{Alex}$ are their mean values. The mean values correspond to pixel intensities across rows and columns (m and n) correspondingly. Lower values of the CC indicate that the data is more complementary.

The results are shown in Table 3 below:

TABLE 3

| Data Type | Feature | CCC |
|---|---|---|
| Digital | Train Alex - Train VGG | 0.047 |
| | Test Alex - Test VGG | 0.045 |
| Print-Scan (HP) | Train Alex - Train VGG | 0.024 |
| | Test Alex- Test VGG | 0.009 |
| Print-Scan (RICOH) | Train Alex- Train VGG | 0.007 |
| | Test Alex- Test VGG | 0.012 |

It will be noted that the CC values (referred to as "CCC" in the table) are all very low, thereby indicating that the features obtained from the two D-CNNs are complementary in nature—i.e. that in combination they have a synergistic effect.

Figure 9:
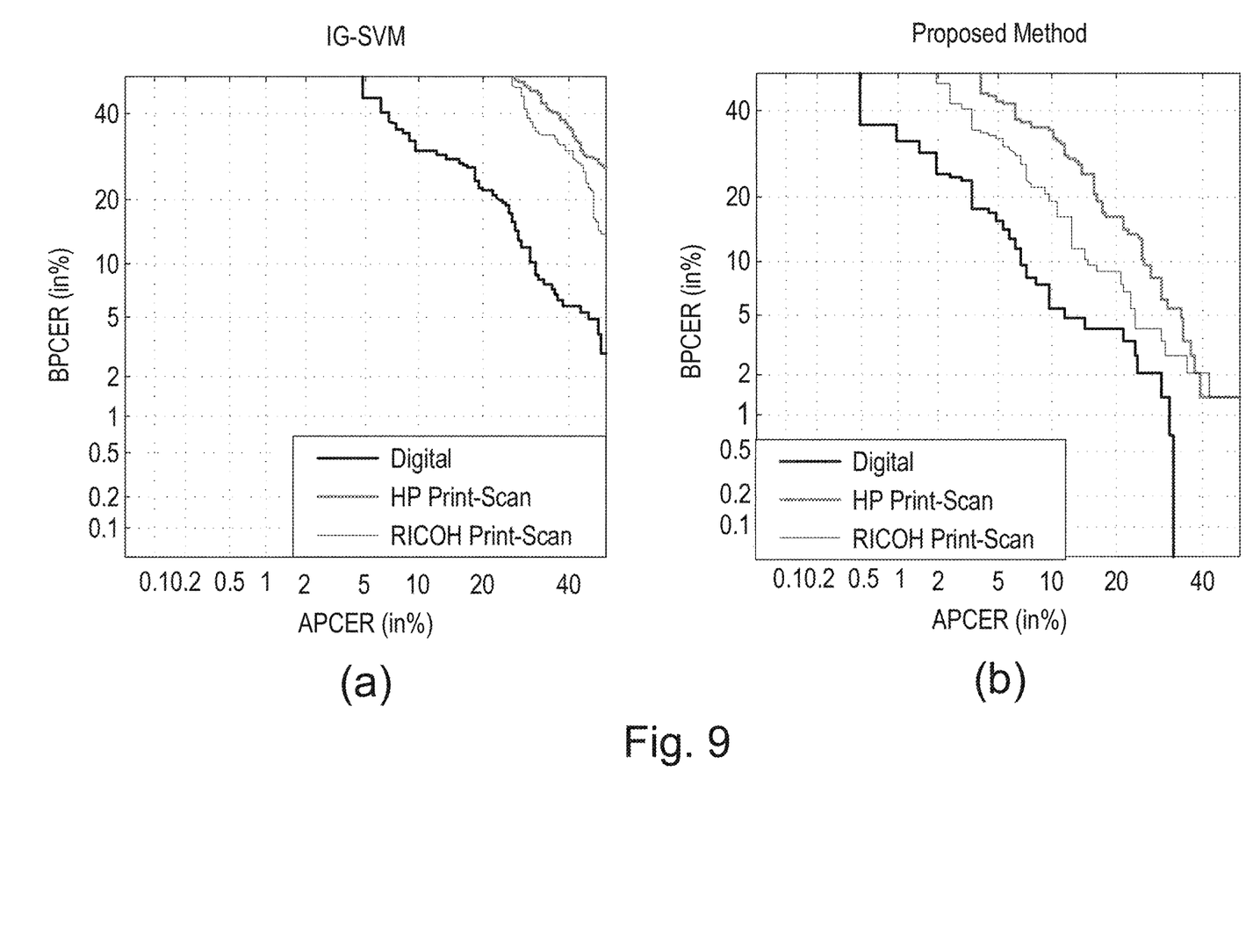
FIG. 9 is a pair of graphs comparing the performance of the IG-SVM method (a) with that of the second embodiment (b).

To examine the morph detection performance of the classifier, let the FC-6 features extracted from AlexNet be $F_A$ and VGG19 be $F_V$. The extracted features are then combined by concatenating them to form a single feature vector $Tr_F = [F_A \| F_V]$ that was used to train the P-CRC (other equivalent classifiers such as SVM, Random Forest can also be employed). The test face image $F_{Te}$ is then projected independently on the FC-6 layers of AlexNet and VGG19 networks to obtain the corresponding features and let these be $Fte_A$ and $Fte_V$. These features are then combined using feature concatenation to form a single vector $Te_F = [Fte_A \| Fte_V]$ that is used as test feature vector specifically with P-CRC to obtain the morphing detection scores. The P-CRC used in this work utilizes the Regularised Least Square Regression (LSR) on the learned feature vectors versus the probe feature vectors formulated as:

$$\hat{F} = \text{argmin}_\alpha \|Te_F - \mathcal{D}\alpha\|_2^2 + \lambda \|\alpha\|_2^2 \quad (2)$$

where the $Te_F$ is the feature vector of the test image, $\mathcal{D}$ is the learned collaborative subspace dictionary using $Tr_F$, $\alpha$ is coefficient vector and $\lambda$ is the regularization parameter. The distance obtained is used as the morphing detection score to obtain the morphed face detection performance—see the discussion of FIG. 9 under the Experiments below.

Experiments

The second embodiment was evaluated on a morphed face image database, which was created using a publicly available face database comprised of 104 subjects. The morphed face images were generated using freely available software packages such as GNU Image Manipulation Program v2.8 (GIMP) and GIMP Animation Package (GAP) tools with the manual intervention to align the landmark points to achieve high quality morphed images. Then to simulate the real-life scenario of the passport issuance procedure, a print-scanned version of the digitally morphed images was generated.

Thus, each of the digitally morphed images was printed using high-quality photo paper (300 grams) and an HP Photosmart 5520 with a print resolution of 1200 dpi. In the next step, the printed images were scanned using two different kinds of scanners: (i) an HP Photo Scanner and (ii) a RICOH office scanner. The printed photos were scanned to have 300 dpi following the specification from ICAO regarding the face image reference in the ePass.

Figure 8:
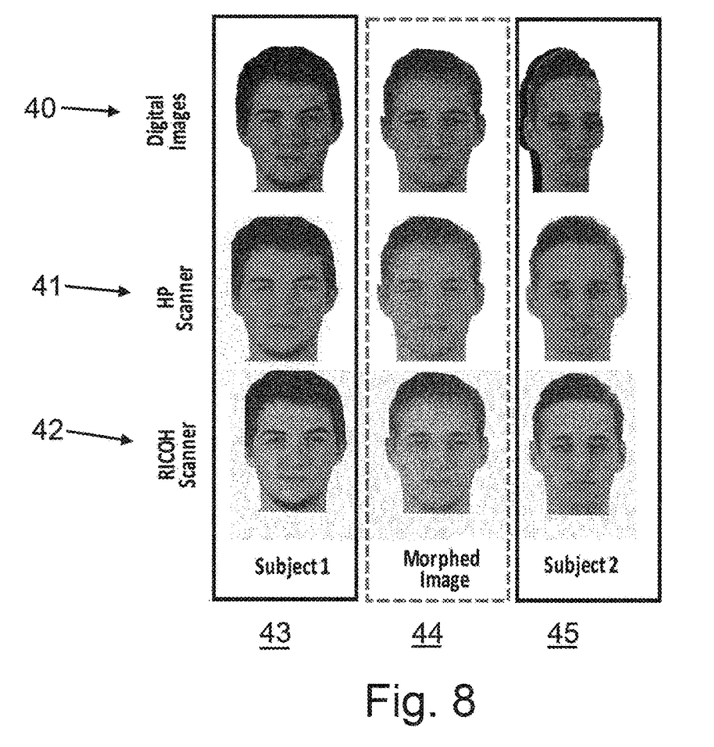
FIG. 8 is a set of normalised images of pairs of subjects and corresponding morphed images for use in creating a morphed image database for use with the second embodiment.

FIG. 8 illustrates an example of the digitally morphed image 40 (top row), print-scanned images using HP scanner 41 (middle row) and print-scanned images using RICOH scanner 42 (bottom row). The middle image 44 in each row of FIG. 8 corresponds to the morphed face image generated using the two different subjects 43, 45 that are shown in either side of the morphed face image.

As one can notice from FIG. 8, the perceptual image quality degrades with the print-scanned process. This effect makes the detection more challenging. The database employed in this work has 352 bona fide and 431 morphed face images (for all three versions such as digital, print-scanned using HP and print-scanned using RICOH) that are partitioned into two disjoint (or non-overlapping) sub-sets used for training and testing. For the training set and the testing set the distribution of samples are presented in Table 2 above.

The process of generating the morphed face images involves a series of pre-processing and post-processing operations on the images that result in different quality when compared to that of the bona fide images. Such differential quality measures may bias the morph detection performance as the classifier may detect the quality/compression differences rather than the effects of morphing. Thus, the inventors took the additional care to have the same quality of the morphed and bona fide face images by applying an equivalent sequence of pre- and post-processing operations on both bona fide and morphed face images.

The performance of the morphed face detection algorithms are reported utilizing Detection Error Trade-off (DET) plots depicting the correlation between Attack Presentation Classification Error Rate (APCER) and Bona Fide Presentation Classification Error Rate (BPCER), which are defined following ISO/IEC 30107-3 as:
  APCER: proportion of attack presentations (i.e. morphed face samples) incorrectly classified as bona fide presentations in a specific scenario.
  BPCER: proportion of bona fide presentations incorrectly classified as presentation attacks (i.e. morphed image) in a specific scenario.
In addition, results are presented by setting a fixed APCER at 5% and 10% and reporting the corresponding BPCER. Lower values of both APCER and BPCER achieved by the morphed face detection algorithm will represent the best detection performance.

Two different experiments were performed to evaluate the robustness of the method in the inventors' benchmark with state-of-the-art morphed face detection algorithms:

Experiment 1: In this experiment, the detection performance of the proposed method together with the state-of-the-art methods were evaluated independently on the digital and print-scanned morphed face image database. This experiment analysed the performance of the detection schemes such that the training and the test data were from the same source (either digital or print-scanned (HP) or print-scanned (RICOH)). Thus, the detection methods will have prior knowledge of the type of the printer/scanner used to generate print-scanned morphed face image to be detected.

Experiment 2: This experiment was designed to test the robustness of the morphed face detection algorithms including that of the embodiment. The morph detection methods were trained and tested on the different sources of the data. For example, the morphed face detection algorithms were trained on the digital version of the database and tested on the print scanned (either HP or RICOH). This experiment indicated the generalizing capability of the morph detection algorithms. Further, Experiment 2 also addresses the realistic scenario of detecting the morphed face image as different scanners are used at different passport issuing authorities around the globe.

Table 4 below shows the quantitative results of the proposed scheme in a benchmark with four different state-of-the-art algorithms evaluated independently on the digital subset, the HP-print-scanned subset and the RICOH-print-scanned subset.

TABLE 4

| Datasets | Algorithms | D-EER (%) | BPCER (%) at APCER = 10% | BPCER (%) at APCER = 5% |
|---|---|---|---|---|
| Digital | LBP-SVM [10] | 29.28 | 44.52 | 56.84 |
| | LPQ-SVM [10] | 26.12 | 42.46 | 52.73 |
| | IG-SVM [10] | 21.88 | 30.13 | 41.78 |
| | BSIF-SVM [10] | 22.70 | 38.25 | 49.31 |
| | Proposed Scheme | 8.23 | 7.53 | 14.38 |
| HP Print-Scan | LBP-SVM [10] | 34.35 | 61.64 | 69.17 |
| | LPQ-SVM [10] | 49.82 | 92.46 | 94.52 |
| | IG-SVM [10] | 38.35 | 73.28 | 80.13 |
| | BSIF-SVM [10] | 26.12 | 45.89 | 55.47 |
| | Proposed Scheme | 17.64 | 32.87 | 41.78 |
| RICOH Print-Scan | LBP-SVM [10] | 22.70 | 58.21 | 42.46 |
| | LPQ-SVM [10] | 39.18 | 74.65 | 82.87 |
| | IG-SVM [10] | 34.35 | 52.05 | 63.69 |
| | BSIF-SVM [10] | 23.29 | 43.83 | 54.79 |
| | Proposed Scheme | 12.47 | 16.43 | 28.76 |

FIG. 9 illustrates the DET curve showing the performance of the proposed method and the state-of-the-art methods based on the Image Gradients (IG-SVM) on all three morphed face data types. For simplicity, only two DET curves are included while all of the results are detailed in Table 4 above. The following are the main observations from Experiment 1:
  The system of the second embodiment demonstrated the best detection performance on all three independent evaluations on both digital and print-scanned version of the morphed face database. It has shown the least Detection Equal Error Rate (D-EER (%)) of 8.23% on the digital image database, the D-EER of 17.64% on print-scanned (HP) and a D-EER of 12.47% on print-scanned (RICOH). The second best detection performance is noted for the BSIF-SVM scheme.
  In general, the detection performance of the state-of-the-art schemes based on micro-texture schemes shows a degraded performance on all three version of the database.
  The detection performance of the morph detection algorithms including the system of the second embodiment shows degraded performance on the print-scanned version of the database when compared with the digital version. It is still interesting to note the performance of the embodiment, especially on the print-scanned database generated using RICOH, has indicated a reasonable performance with an D-EER of 12.47% and a BPCER=16.43% @ APCER=5%. This shows the robustness of the proposed scheme on detecting both digital and print-scanned morphed face images.

The type of the scanner also influences the performance of the morphed face detection algorithms. The experiments revealed that the use of a high quality printed photo together with the photo scanner make the morph detection more challenging. This fact is demonstrated in the experiments as the performance of the morphed face detection algorithms including the embodiment has indicated high error rates on the print-scanned database generated using the photo scanner from HP when compared to the print-scanned database created using the office scanner from RICOH.

Table 5 below shows the performance of the proposed and state-of-the-art schemes on the cross database evaluation following Experiment 2:

TABLE 5

| Training Set | Testing set | Algorithm | D-EER (%) | BPCER (%) at APCER = 10% | BPCER (%) at APCER = 5% |
|---|---|---|---|---|---|
| Digital | Print-Scan (HP) | BSIF-SVM | 26.70 | 48.63 | 56.16 |
|  |  | Proposed Scheme | 15.05 | 24.65 | 39.72 |
| Digital | Print-Scan (RICOH) | BSIF-SVM | 27.53 | 57.53 | 65.75 |
|  |  | Proposed Scheme | 15.05 | 17.80 | 28.08 |
| Print-Scan (HP) | Digital | BSIF-SVM | 21.29 | 40.41 | 52.05 |
|  |  | Proposed Scheme | 19.88 | 34.24 | 45.89 |
| Print-Scan (HP) | Print-Scan (RICOH) | BSIF-SVM | 28.11 | 58.90 | 67.80 |
|  |  | Proposed Scheme | 13.06 | 21.23 | 28.76 |
| Print-Scan (RICOH) | Print-Scan (HP) | BSIF-SVM | 27.53 | 60.95 | 65.75 |
|  |  | Proposed Scheme | 19.05 | 28.08 | 40.41 |
| Print-Scan (RICOH) | Digital | BSIF-SVM | 23.29 | 34.93 | 52.05 |
|  |  | Proposed Scheme | 20.71 | 30.13 | 37.67 |

For simplicity, the results of the proposed scheme are presented along with the second best method based on the BSIF-SVM. The following are the main observations deduced from Experiment 2:

The performance of the morph detection algorithms is degraded when compared to that of the results obtained in Experiment 1.

The best detection performance is noted with the embodiment that significantly indicates the improved performance over the state-of-the-art schemes.

The best detection performance of the embodiment is observed when the training data corresponds to the digital version of the morphed face database and testing the print-scanned version of the database. This indicates the robustness of the embodiment when compared to that of the state-of-the-art schemes. Thus, based on extensive experiments, the system of the second embodiment has emerged as the best method in detecting the morphed face images in both digital and print-scanned version generated from the different kinds of scanner. It also shows the best performance on the cross database evaluation following the protocol indicated in the Experiment 2 indicating the applicability of proposed method compared to other state-of-art methods.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. An apparatus for detecting morphed or averaged images, wherein each of the morphed or averaged images are synthetically generated images comprising information from two or more different source images corresponding to two or more subjects, the apparatus comprising:
    a feature extraction module for receiving an input image and outputting a set of descriptor feature(s) characteristic of the image; and
    a classifier module configured to allocate the input image either to a first class indicating that the image has been morphed or averaged or a second class indicating that it has not been morphed or averaged, based on the descriptor feature(s);
    wherein the classifier module comprises a machine-learning system trained to classify single images using a training data set comprising morphed or averaged images and images that have not been morphed or averaged.

2. The apparatus as claimed in claim 1, wherein the feature extraction module comprises a machine-learning system and the descriptor features depend on parameters determined from the use of a training data set comprising images.

3. The apparatus as claimed in claim 2, wherein the training data set comprises morphed or averaged images and images that have not been morphed or averaged.

4. The apparatus as claimed in claim 1, wherein the morphed or averaged images are morphed or averaged facial images.

5. The apparatus as claimed in claim 1, further comprising an image pre-processing module arranged to extract and normalise a region of interest (for example a human face) from the image and to transmit the pre-processed image to the feature extraction module.

6. The apparatus as claimed in claim 1, wherein the feature extraction module comprises a set of filters that are convolved with patches of the input image to provide a set of descriptor feature(s).

7. The apparatus as claimed in claim 6, wherein the set of descriptor features comprises a string of binarised quantities derived from the convolutions, for example BSIF, as described herein.

8. The apparatus as claimed in claim 1, wherein the classifier module comprises a linear support vector machine or a probabilistic collaborative representation classifier.

9. The apparatus as claimed in claim 1, wherein the feature extraction module comprises at least one convolutional neural network.

10. The apparatus as claimed in claim 9, wherein the feature extraction module comprises a plurality of substantially statistically independent neural networks providing complementary descriptor feature(s) to the classifier module.

11. The apparatus as claimed in claim 9, wherein the neural network(s) comprise deep convolutional neural network(s), preferably having three or more convolutional layers.

12. The apparatus as claimed in claim 11, wherein the descriptor features are extracted from the first fully-connected layer of each deep convolutional neural network.

13. The apparatus as claimed in claim 10, wherein the apparatus further comprises a feature level fusion module for combining descriptor feature data from each neural network and transmitting the fused (e.g. concatenated) feature data to the classifier module.

14. The apparatus as claimed in claim 9, wherein the neural network(s) are individually trained using a set of images comprising morphed or averaged images and images that have not been morphed or averaged in order to train their filters to provide descriptor features suited for determining whether an image has been morphed or averaged.

15. An apparatus for detecting morphed or averaged images, wherein each of the morphed or averaged images are synthetically generated images comprising information from two or more different source images corresponding to two or more subjects, the apparatus comprising:
 a feature extraction module for receiving an input image and outputting a set of descriptor feature(s) characteristic of the image; and
 a classifier module configured to allocate the input image either to a first class indicating that the image has been morphed or averaged or a second class indicating that it has not been morphed or averaged, based on the descriptor feature(s); wherein
 the feature extraction module comprises a plurality of neural networks providing complementary descriptor feature(s) to the classifier module;
 the apparatus further comprises a fusion module for combining descriptor feature data from each neural network and transmitting the fused feature data to the classifier module; and
 the classifier module comprises a machine-learning system trained to classify the images using a training data set comprising morphed or averaged images and images that have not been morphed or averaged.

16. The apparatus as claimed in claim 15, wherein the neural networks are different deep convolutional neural networks.

17. The apparatus as claimed in claim 15, wherein the neural networks are substantially statistically independent.

18. The apparatus as claimed in claim 15, wherein the morphed or averaged images are morphed or averaged facial images.

19. The apparatus as claimed in claim 15, further comprising the features of claim 2.

20. A method of detecting morphed or averaged images, wherein each of the morphed or averaged images are synthetically generated images comprising information from two or more different source images corresponding to two or more subjects, the apparatus comprising:
 receiving an input image;
 generating a set of descriptor feature(s) characteristic of that image;
 classifying the image by allocating it to either to a first class indicating that the image has been morphed or averaged or a second class indicating that it has not been morphed or averaged, based on the descriptor feature(s);
 wherein the classification step comprises using a machine-learning system trained to classify single images using a training data set comprising morphed or averaged images and images that have not been morphed or averaged.

21. The method as claimed in claim 20, wherein the step of generating the descriptor feature(s) comprises using a plurality of preferably substantially statistically independent neural networks providing complementary descriptor feature(s) to the classifier module; and descriptor feature data from each neural network is combined prior to classification.

22. The method according to claim 20, further comprising the step of training a classifier used in the classifying step.

23. The method according to claim 20, comprising training a feature extraction module that generates the descriptor feature(s) using a set of images comprising morphed or averaged images and images that have not been morphed or averaged in order to train the module to provide descriptor features suited for determining whether an image has been morphed or averaged.

24. A computer programme product comprising instructions that when executed on a computer configure the computer to perform the method of claim 20.

* * * * *